United States Patent Office.

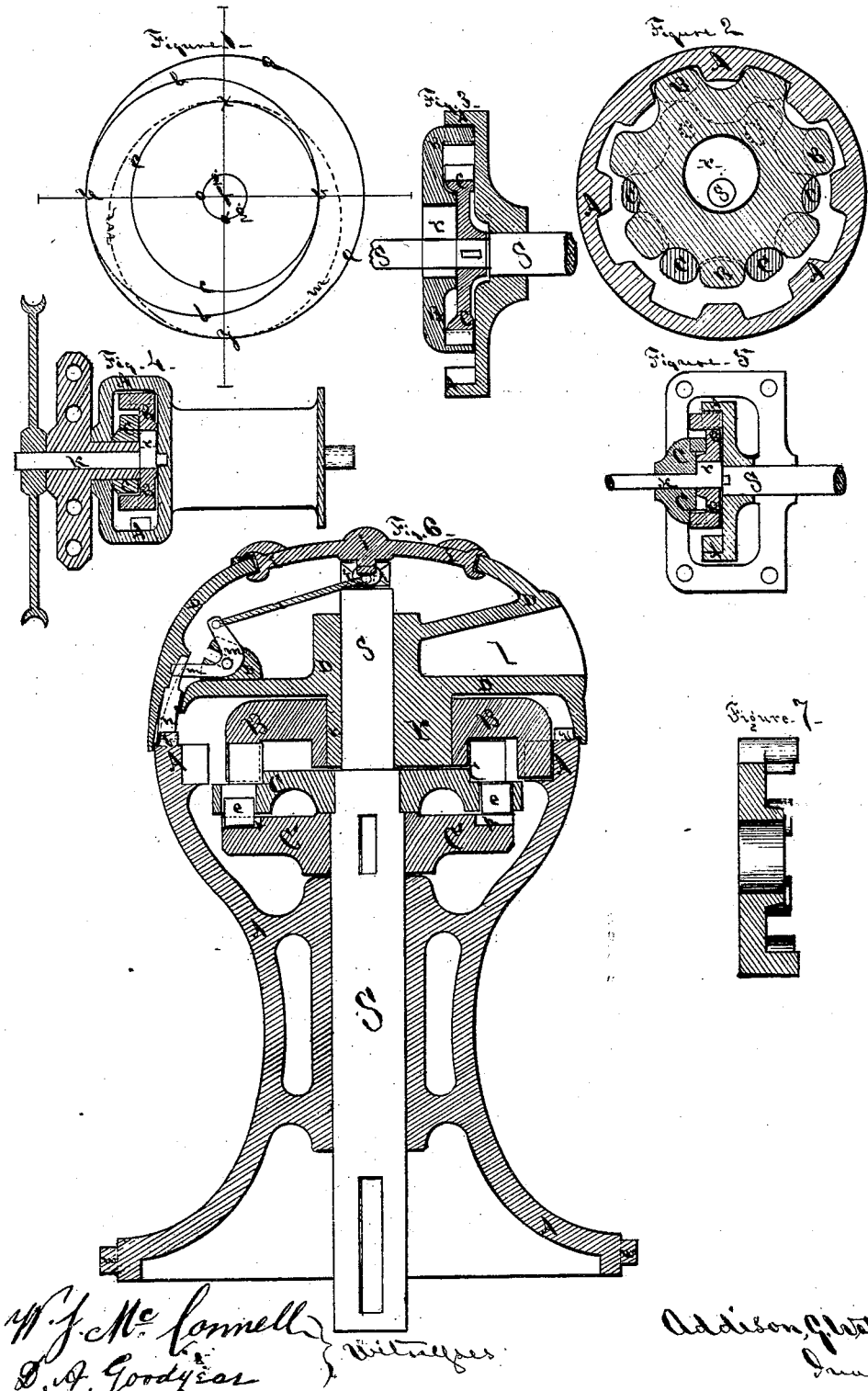

ADDISON GOODYEAR WATERHOUSE, OF SAN FRANCISCO, CALIFORNIA.

Letters Patent No. 102,454, dated April 26, 1870.

IMPROVEMENT IN ROTARY MECHANICAL MOVEMENT.

The Schedule referred to in these Letters Patent and making part of the same.

I, ADDISON GOODYEAR WATERHOUSE, of the city and county of San Francisco, State of California, have invented a new and Improved Rotary Mechanical Motion, of which the following is a specification.

Nature and Object of the Invention.

The first part of my invention relates to the combination of three wheels in one, forming a three-fold compound wheel consisting in the combination of an annular wheel, a center wheel, and a circulating wheel with a crank or eccentric, and consists of a compact and durable arrangement of said parts to form a device which is applicable to capstans, hoists, and all winding-machines, or all kinds of rotary mechanical gearing in which a comparatively quick rotary motion is to be reduced to a slower one with a proportional increase of power, or in which comparatively slow motion is to produce a more rapid one.

My invention further relates to the combination of ratchets, pawls, friction-brakes, and engaging or shipping-gears, in combination with any of the parts of my said rotary mechanical motion, whereby a variety of motions is produced, and different degrees of power attained in the same wheel.

Description of the Accompanying Drawings.

Figure 1 is a diagram, showing the pitch-circle of the three wheels, the circle described by the center of the circulating wheel, and also showing the common axis of the wheels A and C.

Figure 2 is an elevation of a machine embodying the most essential parts of my invention.

Figure 3 is a longitudinal section of the machine shown in fig. 2.

Figures 4 and 5 are two different forms of machine shown in figs. 2 and 3, in which wheel C is stationary, and wheel B is propelled by an eccentric attached to or made part of a propelling-shaft K, in line with the wheel-shaft S. In each of these figures wheels A and C are on opposite sides of circulating-wheel B.

Figure 6 is a vertical section of a capstan having my improvements on a plane passing through the axis of the capstan.

Figure 7 is a view of wheel B.

Like letters refer to like parts.

General Description.

My invention relates to a novel system of rotary gearing of very general application in machinery, and consists primarily and essentially of three toothed wheels, designated throughout this specification as wheel A, or the outer wheel, wheel B, or the circulating wheel, and wheel C, or the center wheel; all of said wheels being situated in the same or parallel planes.

Wheels A and C are concentric, having a common axis.

Wheel B has an axis parallel to the axis of wheels A and C, but eccentric to them.

All of said wheels to be so proportioned that the pitch-circle of the cogs of wheel B will be in contact with the pitch-circle of the cogs of wheel A on one side, and the cogs of wheel B be in contact with the cogs of wheel C on the opposite side of said wheel B, so that the two points of contact will be in straight line across both axes of the wheels A and C, and the axis of wheel B.

The accompanying diagram, fig. 1, will still more clearly define the constant relative position and motion of the aforesaid wheel;

$a$ representing the pitch-circle of wheel A;

$b$ representing the pitch-circle of wheel B; and $c$ representing the pitch-circle of wheel C;

$f$, the common axis of wheels A and C; and $g$, the circle described by the center of wheel B as it is circulated around the center $f$ of wheels A and C.

In order to calculate the relative velocity of the different wheels, and the means by which they are propelled, we will continue our reference to diagram fig. 1.

In it the points of contact of wheels A and B are at $u$, and of wheels B and C are at $v$, and the center of wheel B at $o$, so we find that $u$, $o$, $f$, and $v$ are all in a straight line; now, if the center of wheel B, $o$, is swung around its circle $g$ to $o$, then the points of contact of the three wheels would be at $x$ and $y$, bringing $x$, $f$, $o$, and $y$ all in a right line, as shown by dot line $m$.

Now, it is evident that if the circle $c$ is fixed, and $o$, (the center of wheel B,) is caused to move around the circle $g$, which is around the center of wheels A and C, then $b$ will roll around on the fixed circle $c$, and $b$ will also roll on $a$, and when $o$ has completed its revolution the diagram will still represent the position of the circles and points as at first, but every point in $b$ will have advanced in the direction moved by $o$ a distance equal to $b$ $c$, and every point in $a$ will have advanced in the same dirction equal to the distance of $(a-b)+(b-c)=x$.

Now, if circle $a$ is fixed, and circle $c$ set free to revolve, and $o$, (the center of wheel B,) be caused to pass around the circle $g$, as before, once, then the diagram will continue to correctly represent the position of the circles and points as at first, but $b$ and $c$ will have revolved in a contrary direction to the one described by $o$, $b$ will have advanced a distance equal $a-b$, and every point in $c$ will have advanced in the same direction equal to $a-b+b-c$.

For a further illustration let us apply this calculation to fig. 2 and fig. 3. First, supposing the shaft S and wheel C to be fixed with a brake, and the other free to revolve: now, as the pitch distances of all the cogs in these three wheels are equal, and B has one cog less than A, and C has one cog less than B, or two less than A—for, in this case, A has eight cogs, B has seven, and C has six—now, as $o$, (the center of B,) is propelled once around the center of A and C by the cam $r$ revolving around the shaft or center of A and C, then the revolution of B would be, if measured by cogs, equal to 7—6=1, and the revolution of A would be equal to (7—6)+(8—7)= 2, or two cogs or two-eighths of a revolution, making four revolutions of the cam $r$ to one of the wheel A; now, if wheel A is prevented from revolving, and wheels B and C let free to revolve, then at one revolution of the cam $r$, the wheel C would revolve in an opposite direction equal to A—B+B—C = (8—7)+(7—6) = 2, or two-sixths of a revolution, or three revolutions of the cam $r$ to one of the wheel C.

It will be seen from the foregoing description of this mechanical movement or system of gearing of which my invention consists, that, although mention is made in this specification of only a few applications of which it is susceptible, it is really a device of extensive utility and adaptability.

In the application of my invention the circulating-wheel B may have either one or two circles of cogs. If one circle, it must always be in contact with the pitch-circle of A on one side, and with C on the opposite side, but if wheel B has two pitch-circles, or two circles of cogs, whether they are both upon one face or surface, or upon the opposite faces of said wheel, or in whatsoever form they may be, the cogs of wheel B, that engage in the cogs of wheel C, must engage upon the opposite side of wheel B to those of its cogs that engage in wheel A, that is, said points of contact will always be found on opposite sides of wheel B, and the cogs of B that engage in the cogs of A must be on the same plane, and the cogs of B that engage with wheel C must also be on one plane. Still, wheels A and C may be on opposite surfaces of wheel B, but have a common axis.

Now, it has been seen, when the center of B is circulated around the center of A and C, that if C is fixed, A revolves the way that the center of B circulates, and if A is fixed, C revolves in the opposite direction that the center of B circulates. Therefore, it is evident that if C is fixed, and A revolved, or if A is fixed and C revolved, it would cause rapid circulating of the center of wheel B, thus causing a rapid revolution of the eccentric in the wheel B. When this rapid motion is used I prefer a crank to an eccentric.

In fig. 3 the eccentric $r$, that revolves or circulates the wheel B, is made hollow, and revolves around the shaft S; the eccentric in the capstan, fig. 6, is made likewise.

In figs. 4 and 5 the eccentric $r$ is rigidly attached to, or made part of another shaft, $k$, which, when revolved, revolves the eccentric $r$, causing the center of wheel B to circulate, moving wheel A or C, as above set forth. In both of these A and C are on opposite sides of wheel B, wheel C being fixed, and wheel A made to revolve.

In the capstan represented in fig. 6, $l$ is one of the sockets for the capstan-bars $m$, a bell-crank attached to D operated by suitable apparatus $i$ for the purpose of controlling pawl $n$.

In this capstan the wheel C is divided in two C C', the part C being free to revolve upon shaft S and upon C' in one direction, but prevented from revolving in the other by being connected and disconnected automatically with C' by means of the pawls $e$ and ratchet $p$, C' being keyed to shaft S.

A in this capstan is provided at its upper extremity with a ratchet, $q$, in the teeth of which work the pawls $n$.

The lower part of A forms the waist or drum upon which the rope or chain is wound, the foot of the shaft S is keyed to a bed-plate, (not shown,) said bed-plate and the circumference of the foot of A at $w$ are connected with pawls and ratchets in the usual manner.

I claim as my invention—

1. The combination of the three wheels A, B, and C, to be propelled in the manner and for the purposes substantially as hereinbefore set forth.

2. The combination of brakes, clutches, or other devices with either wheel A, B, or C, for the purposes of creating a variety of motions in the same machine, as described.

3. The wheel C, divided into two parts C and C', fig. 6, substantially as and for the purpose hereinbefore set forth.

ADDISON GOODYEAR WATERHOUSE.

Witnesses:
W. J. McCONNELL,
D. A. GOODYEAR.